United States Patent Office 3,419,386
Patented Dec. 31, 1968

3,419,386
POWDER METALLURGICAL PROCESS FOR MAKING AN ELECTROLYTIC CAPACITOR ANODE
Harry W. Holland, Fairview Park, and Walter F. Helvey, Cleveland, Ohio, assignors to Union Carbide Corporation, a corporation of New York
No Drawing. Continuation of application Ser. No. 388,268, Aug. 7, 1964. This application Mar. 9, 1967, Ser. No. 622,001
8 Claims. (Cl. 75—201)

ABSTRACT OF THE DISCLOSURE

A process for producing a sintered anode for an electrolytic capacitor from powdered anode metal having carbon and oxygen contents of less than 500 p.p.m. and from 1,000 to 5,000 p.p.m., respectively. A carbon containing material is added to the powder before sintering in amounts sufficient to remove during sintering the oxygen content in excess of an amount of from 1,000 to 1,500 p.p.m.

---

This application is a continuation of copending application Ser. No. 388,268, filed Aug. 7, 1964 and now abandoned.

This invention relates to a process for making anodes for electrolytic capacitors and the capacitors made therefrom.

Electrolytic capacitors of the type having a porous plug as the anode are made by molding particles of a suitable metal, such as tantalum or columbium for example, into a desired shape and sintering that body to produce a porous metal anode. By means of an electrolytic process, the surfaces of the sintered particles forming the plug are converted into an oxide layer. This oxide layer forms a dielectric between the tantalum anode, for example, and a subsequently applied conductive cathode layer.

The oxidized porous metal anode is then dipped into a concentrated manganese nitrate solution and then heated in an oven to convert the manganese nitrate to manganese oxide. This step may be repeated several times to provide for a complete filling of the pores of the anode with manganese oxide. The plug is then subjected to a "healing" operation, as by electrolytically reoxidizing the anode. By means of this process, manganese oxide in and around any defects in the anode oxide layer is converted to other more insulating forms of manganese oxide. This converted manganese oxide helps reduce direct current leakage while the remainder of the manganese oxide acts as the dry electrolyte for the capacitor. A conductive layer of graphite is applied to the anode. The anode can then be placed in a cathode can with the carbon layer conducting to the can. The capacitor is completed by attaching anode and cathode leads and sealing the assembly.

This invention applies to capacitors made by the above process as well as to capacitors made by other processes, providing that a metal powder of the type indicated is pressed into a shape and sintered to form the anode for it has been found that the quality of the tantalum powder used in the manufacture of such anodes has a direct bearing on the quality of the sintered tantalum anode, as measured by the performance characteristics of the finished capacitor employing that anode. For example, when tantalum powder containing excessive amounts of carbon or oxygen impurities are used, it is found that capacitors having anodes made with such powder tend to have lower breakdown voltages and higher leakage currents.

It is the object of this invention to provide a process for making tantalum anodes which when formed into electrolytic capacitors will have superior electrical properties.

It is also an object of the invention to provide a process for making sintered metal anode plugs having a reduced impurity content.

Other aims and advantages of this invention will be apparent from the following description and the appended claims.

It has been found that the tantalum powder used in the manufacture of sintered anodes generally contains oxygen and carbon. While these two impurities will react at the high sintering temperatures and form carbon monoxide, which is removed by the vacuum pumps during the heating operation, it has been found beneficial to use powder having a specific range of carbon and oxygen impurities and to add dopants for the purpose of lowering the impurity levels to certain optimum carbon and oxygen contents in the finished anode, whereby superior capacitors are produced. More specifically, the process of this invention comprises providing a tantalum powder containing no more than 5,000 parts per million (p.p.m.) oxygen and no more than 500 p.p.m. carbon, adding to said powder and mixing therewith a carbon containing material such as tantalum carbide or powdered carbon (graphite) in stoichiometric amounts to form carbon monoxide and leave residual oxygen and carbon contents of from 1,000 to 1,500 p.p.m. oxygen and no more than 30 p.p.m. carbon containing material into an anode shape and sintering boncontaining material into an anode shape and sintering said shape under vacuum conditions to produce a sintered tantalum anode having an oxygen content of from about 1,000 to 1,500 p.p.m. oxygen and no more than about 30 p.p.m. carbon.

It has been found that superior capacitors are produced when the oxygen and carbon contents of the tantalum powder are from 1,200 to 5,000 p.p.m. oxygen and no more than 500 p.p.m. carbon, and where tantalum carbide or graphite is added to this powder to form carbon monoxide during sintering but leaving as residuals in the finished tantalum anode an oxygen content of from 1,000 to 1,500 p.p.m. and less than 30 p.p.m. carbon.

The process of this invention can also be used in regard to the preparation of sintered anodes of metals other than tantalum, namely, columbium, tungsten, hafnium, titanium, and zirconium. These metals are all capable of forming the dielectric oxide films needed for capacitor usage. In the preparation of the powders of these metals, the carbide added as the dopant could be the carbide of the particular metal being used for the anode or it could be the carbide of one of the other anode metals.

The amount of carbon containing material added to the anode metal powder is determined on the basis of the stoichiometric amount of carbon needed to react with the contained oxygen during the sintering process. A convenient manner of calculating the amount of metal carbide required is given below in regard to a metal powder having certain oxygen and carbon contents.

A tantalum metal powder prepared from tantalum roundels is found to have a carbon content of about 90 p.p.m. (parts per million) and an oxygen content of 2,400 p.p.m. The desired final carbon content is less than 30 p.p.m. and the desired final oxygen content of the sintered anode is about 1,300 p.p.m., which is in the desired range of 1,000 to 1,500 p.p.m. oxygen. Assuming that all of the original 90 p.p.m. carbon will be reacted during sintering to form carbon monoxide, it is assumed that $$90 \times \frac{16}{12}$$

p.p.m. of oxygen will be removed, equal to 120 p.p.m. of oxygen. Since 1,300 p.p.m. of residual oxygen is desired, this leaves 2,400 minus (120+1,300), equal to 980 pp.m. of oxygen to be removed from the powder by some amount of carbide. Using tantalum carbide with a molecular weight of 193, the amount of tantalum carbide needed to react with 980 p.p.m. of oxygen can be determined as follows using equivalent weights:

$$\frac{980 \text{ p.p.m. } O_2}{16} = \frac{\text{p.p.m. TaC}}{193}$$

The amount of tantalum carbide required thus will be about 11,711 p.p.m. TaC. As a percentage addition to the tantalum powder, the amount of TaC to be added would be 11,711 divided by one million, equal to 1.17%.

An amount of 1.17 percent TaC was added to a tantalum powder sample having the original carbon and oxygen contents indicated above. This mixture was molded into anode shapes and sintered at a temperature above 1,800° C. and under a vacuum of below $10^{-4}$ torr. Carbon and oxygen combined to form carbon monoxide which was drawn off by the vacuum pumps. The sintered anode plug was found on chemical analysis to have a residual carbon content of about 20 p.p.m. and a residual oxygen content of about 1,400 p.p.m., which is within the desired range. The deviation from the predicted oxygen content of 1,300 p.p.m. was due to the approximations and assumptions made, as well as an expected error of ±100 p.p.m. in oxygen analysis. The method outlined above for determining the amount of carbide needed to reach a given desired final oxygen content is satisfactory for most purposes.

Several other samples of the same basic tantalum powder were mixed with varying amounts of tantalum carbide, pressed into anode shapes and sintered under the same conditions outlined above. Table I shows the treatment performed on each sample as well as the oxygen and carbon analysis of the sintered plug.

TABLE I.—CHEMICAL ANALYSIS

| Lot No. | Treatment | Parts Per Million | |
| --- | --- | --- | --- |
| | | C | $O_2$ |
| | Original Ta powder | 90 | 2,400 |
| 1 | None, 100% original powder | 10 | 1,900 |
| 2 | 1% TaC added | 20 | 1,400 |
| 3 | 1.17% TaC added | 20 | 1,400 |
| 4 | 1.30% TaC added | 20 | 1,100 |
| 5 | 1.43% TaC added | 20 | 1,200 |

Table II shows the electrical performance characteristics of capacitors made with these anodes.

TABLE II

[Performance: 22 µf., 50-volt capacitors]

| Lot No. | Breakdown Voltage, volts | Capacitance C, µf. | Leakage Current L, µa. | Dissipation Factor, Percent |
| --- | --- | --- | --- | --- |
| 1* | 245 | | | |
| 2 | 280 | 21.9 | .175 | 3.38 |
| 3 | 293 | 21.3 | .317 | 2.98 |
| 4 | 320 | 22.0 | .14 | 3.4 |
| 5 | 267 | 22.0 | .031 | 3.34 |

*All lost in reformation.

Another series of tests were conducted using a tantalum powder having an original carbon content of 100 p.p.m. and an oxygen content of 2,300 p.p.m. Various amounts of tantalum carbide were added to this powder and sintered anode plugs were prepared from the mixture as above. Table III shows the chemical analysis of the plugs as well as the performance characteristics of 33 µf, 35v. capacitors made with these plugs. Tantalum carbide was not added to Lot No. 6.

TABLE III

| Lot No. | Analysis, p.p.m. | | Breakdown Voltage, v. | Capacitance µf. | Leakage Current, µa. | Dissipation Factor, percent |
| --- | --- | --- | --- | --- | --- | --- |
| | C | $O_2$ | | | | |
| 6 | 20 | 2,000 | 252 | 33.2 | .138 | 2.86 |
| 7 | 20 | 1,800 | 259 | 34.0 | .057 | 3.36 |
| 8 | 20 | 1,200 | 282 | 35.37 | 0.65 | 3.44 |
| 9* | 80 | 800 | 173 | | | |

*All lost in reformation at 40 volts.

As seen above the capacitors made using the anodes having carbon and oxygen contents after sintering of less than 30 p.p.m. carbon and from 1,000 to 1,500 p.p.m. oxygen performed particularly well. The capacitors made from plugs with analysis outside this range had lower breakdown voltages and higher leakage currents and did not show as great a yield.

It is to be noted that when the oxygen content of the tantalum powder is too low or the carbon content too high, then oxides of tantalum, e.g., can be added to the powder before sintering to bring the final oxygen content of the sintered plugs into the indicated range. The amount of oxides added would be sufficient to raise the oxygen content of the powder above its original content, but less than the maximum of 5,000 p.p.m.

What is claimed is:

1. A process for producing an anode for an electrolytic capacitor comprising providing a powder of an anode metal selected from the group consisting of tantalum, columbium, tungsten, hafnium, titanium, and zirconium, said metal powder containing less than 500 p.p.m. carbon, and over about 1,000 p.p.m. and less than 5,000 p.p.m. oxygen, mixing with said powder an amount of carbon-containing material having sufficient carbon, together with the carbon already in the metal powder, to react with and remove as carbon monoxide during heating that portion of the contained oxygen in said metal powder above an oxygen level in the range of about 1,000 to 1,500 p.p.m., and pressing said powder mixture into an anode shape and sintering said shape under vacuum conditions to produce a sintered anode having an oxygen content of from about 1,000 to 1,500 p.p.m. and less than about 30 p.p.m. carbon.

2. The process of claim 1 in which the carbon-containing material is selected from the group consisting of graphite and a carbide of at least one of the anode metals.

3. The process of claim 2 in which the selected carbon-containing material is a carbide of at least one anode metal.

4. The process of claim 1 in which the anode metal provided is tantalum.

5. The process of claim 4 in which the carbon content of the tantalum metal is less than 100 p.p.m. and the oxygen content is from 1,200 p.p.m. to less than 5,000 p.p.m.

6. The process of claim 4 in which the carbon-containing material is powdered tantalum carbide.

7. A process for producing a tantalum anode for an electrolytic capacitor comprising providing powdered tantalum metal containing less than 500 p.p.m. carbon and from about 1,200 to less than 5,000 p.p.m. oxygen, mixing with said powder an amount of powdered tantalum carbide sufficient, together with carbon in the tantalum metal powder, to react with and remove as carbon monoxide during subsequent heating that portion of the contained oxygen in the range of about 1,000 to 1,500 p.p.m. and to leave an amount of carbon less than 30 p.p.m., and pressing said mixture into an anode shape and sintering the shape at a temperature of above 1,800° C. and at a vacuum of about $10^{-4}$ torr, to produce a sintered anode having an oxygen content of from about 1,000 to 1,500 p.p.m. and less than about 30 p.p.m. carbon.

8. A process for producing an anode for an electrolytic capacitor comprising providing a powder of an anode metal selected from the group consisting of tantalum, columbium, tungsten, hafnium, titanium, and zirconium, said metal powder containing less than 500 p.p.m. carbon and less than about 1,200 p.p.m. oxygen, adding to said powder an oxide of at least one anode metal to raise the contained oxygen level to a point above the original amount but still below 5,000 p.p.m. mixing with said metal powder and metal oxide amount of a carbide of at least one anode metal, the amount of said carbide being sufficient, together with the carbon in said metal powder, to react with and remove as carbon monoxide during heating, that portion of the oxygen in said powder mixture above an oxygen level in the range of about 1,000 to 1,500 p.p.m. and to leave an amount of carbon less than 30 p.p.m., and pressing said mixture into an anode shape and sintering said shape under vacuum conditions to produce a sintered anode having an oxygen content of from about 1,000 to 1,500 p.p.m. and less than about 30 p.p.m. carbon.

References Cited

UNITED STATES PATENTS 3,326,676  6/1967  Rubel et al. _____ 75—201

FOREIGN PATENTS 1,139,922  11/1962  Germany.
951,726  11/1964  Great Britain.

BENJAMIN R. PADGETT, *Primary Examiner.*

R. L. GRUDZIECKI, *Assistant Examiner.*

U.S. Cl. X.R.

75—200, 204